United States Patent [19]
Ross et al.

[11] 3,886,383
[45] May 27, 1975

[54] COMPRESSED BACK IRON LINEAR MOTOR LAMINATED CORE

[75] Inventors: James A. Ross, La Jolla; James A. Houdyshel, San Diego, both of Calif.

[73] Assignee: Rohr Industries, Inc., Chula Vista, Calif.

[22] Filed: Apr. 1, 1974

[21] Appl. No.: 456,620

[52] U.S. Cl. .................. 310/12; 310/216; 310/259; 335/296; 104/148 LM
[51] Int. Cl. .......................................... H02k 41/02
[58] Field of Search ....... 310/12, 13, 216, 217, 218, 310/259; 335/296, 297; 104/148 LM, 148 MS

[56] References Cited
UNITED STATES PATENTS

| | | |
|---|---|---|
| 2,236,291 | 3/1941 | Kilbourne .......................... 310/218 |
| 3,472,141 | 10/1969 | Hilbig et al. ..................... 335/297 X |
| 3,516,364 | 6/1970 | Machefert-Tussin ........ 104/148 LM |
| 3,788,447 | 1/1974 | Stephanoff........................ 310/12 X |

*Primary Examiner*—R. N. Envall, Jr.

[57] ABSTRACT

An improved laminated motor core for a linear induction motor utilizing gramme ring windings. The upper pole piece portion of the core is substantially smaller in width than the widest portion of the lower back iron portion. The cross-sectional perimeter of the back iron portion provides a minimum mean length turn for the gramme ring windings.

14 Claims, 9 Drawing Figures

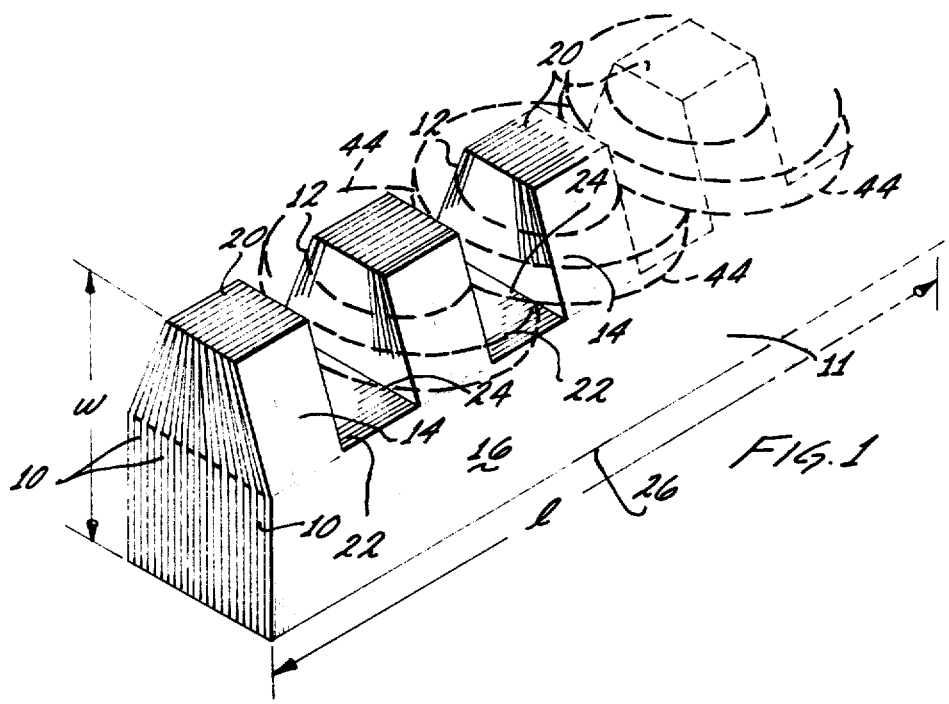
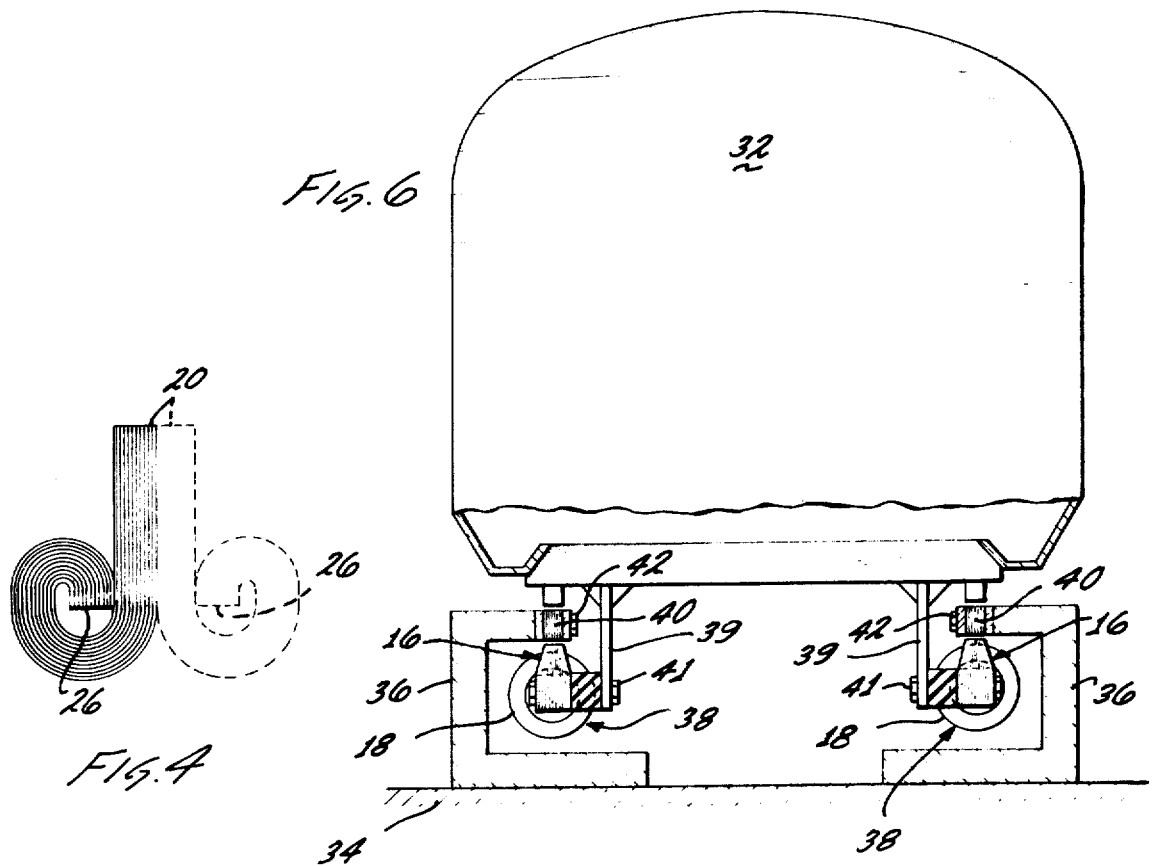

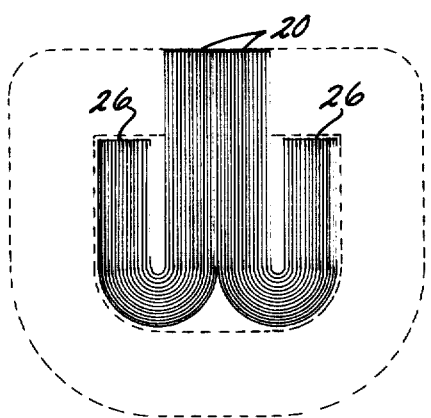
FIG. 2A
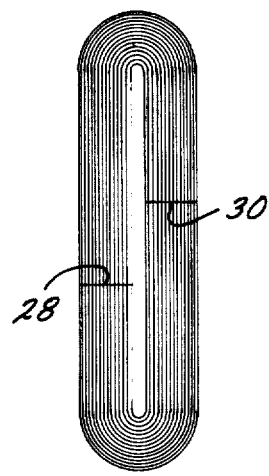
FIG. 2B
FIG. 3A
FIG. 3B
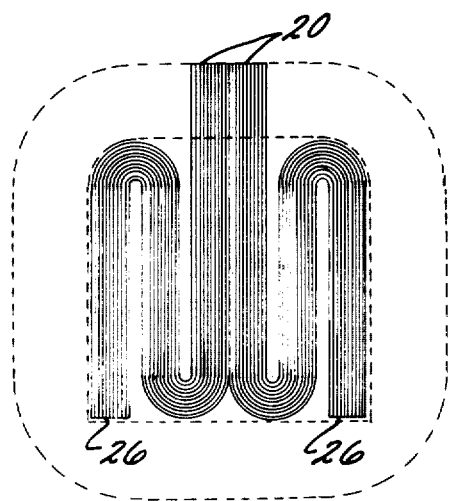
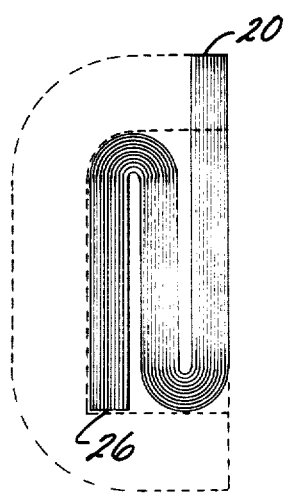
FIG. 5A
FIG. 5B
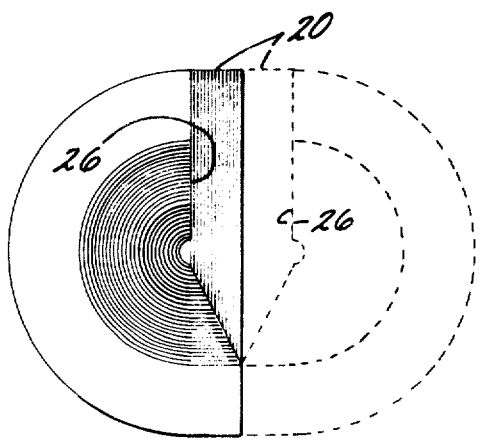
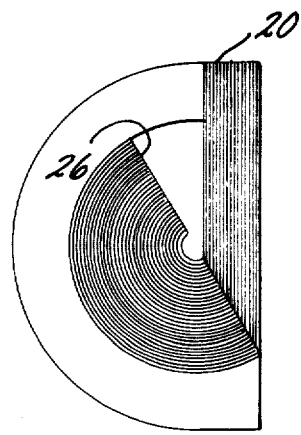

COMPRESSED BACK IRON LINEAR MOTOR LAMINATED CORE

BACKGROUND OF THE INVENTION

The present invention relates to a laminated core for a linear induction motor and more particularly to a core for a linear induction motor having gramme ring or lap windings.

Linear induction motors utilizing gramme ring windings have found wide spread use for propelling surface supported vehicles. It was found, however, that the available cores were not particularly efficient for utilization in linear induction motors for providing the combined suspension, propulsion and guidance of a vehicle, such as disclosed in U.S. Pat. No. 3,736,880, the inventor being the coinventor of the instant application, assigned to the assignee of the instant invention, Rohr Industries, Inc.

It has been determined, by experimentation, that the physical degree of lateral instability between the motor and the reaction rail of a linear induction motor, used as described above, is substantially minimal when the rail width equals the pole piece face width and their widths are as narrow as structurally possible. To provide a sufficient back iron mass for the required flux in a conventional state of the art motor core utilizing gramme ring windings with a minimum mean turn length, the width of the pole piece face is substantially the same width as the back iron resulting in excessive pole piece face cross-sectional area causing excessive lateral instability. Other conventional rectangular core configurations provide the required narrow pole piece faces by sacrificing the back iron configuration. This results in a winding having a gramme ring turn length greater than the desired mimimum mean length. Conventionally, a compromise is made in the dimensions of the rectangular configuration between excessive width of the pole piece face and the back iron configuration, thus the motor does not operate at optimum efficiency.

It would obviously be advantageous to provide a core structure with minimal width at the pole piece faces with a back iron structure having a cross-sectional configuration so as to optimize the mean length turn of the gramme ring winding. Providing an ideal linear induction motor core configuration has not been satisfactorily resolved until the emergence of the instant invention.

SUMMARY OF THE INVENTION

The instant invention provides an improved motor core for a linear induction motor employing gramme ring type windings. The core provides for both maximum lateral stability between the motor and reaction rail and minimum power consumption in minimum mean length turn gramme ring windings for the required magnetic flux.

The width of the reaction rail is determined by the required physical strength needed for vertical vehicle stability and the economic costs of roadbed construction. The ideal reaction rail has the narrowest width allowable to satisfy both the vertical stability and the economic construction costs.

The pole piece faces of the core of the instant invention have widths equal to the ideal rail, thus substantially maximum lateral stability between the motor and the reaction rail is obtained. The back iron portion is substantially wider than the pole piece face so as to provide a cross-sectional area with a perimeter providing the minimum mean length turn for the gramme ring for the given flux requirement so as to provide the most efficient use of supply power.

The foregoing and other features of the invention will become more fully apparent from the following detailed description with reference to the accompanying drawings.

BRIEF DESCRIPTION OF THE DRAWINGS

FIG. 1 is a partial perspective view of one embodiment of the core of the instant invention.

FIGS. 2A, 2B, 3, and 4 show the cross-sectional end views of various different configurations of the core of the instant invention.

FIG. 5A is a cross-sectional view of a core having a closed curvilinear back iron.

FIG. 5B is a cross-sectional view of a core having an open curvilinear back iron.

FIG. 6 shows an end view of a motor/rail vehicle combination employing the core of the instant invention.

DETAILED DESCRIPTION

The cores of linear induction motors, like transformer cores, are generally constructed by the stacking of a series of ferromagnetic laminae either one on top of the other or in a side-by-side relationship. The laminae are then secured together in a tight physical relationship by various attachment means including, but not limited to, adhesive, bolts and external brackets. It is essential that the laminae be held together with sufficient force to prevent vibration therebetween when power is applied.

Referring now to FIG. 1, at least two separate laminae 10 and 12 are used in the construction. Laminate 10 is equal in length $l$ to the longest dimension of the core 11 and approximately ½ the dimension $h$ of laminate 12. The longer dimension $l$ of laminate 12 is provided with a row of evenly spaced teeth 14. It can be seen in FIG. 1 that the back iron portion 16 is substantially square in cross-sectional configuration so as to provide a minimum mean length turn for the gramme ring 18 (shown in FIG. 6). The pole piece face 20 is substantially narrower in cross-sectional surface width than the back iron portion 16. The core 11 of FIG. 1 is constructed by alternately stacking laminae 10 and 12 in a side-by-side relationship with a lamination 12 on both outside surfaces of the stack.

The upper tooth portion 14 of the core 11 is compressed so as to fill the voids created by the short dimension of the alternate laminate 10 terminating on a common plane with the lower surface of notch 22 between the teeth 14. The resulting tooth portion 14 has an upper pole piece surface 20 with a width of approximately ½ the width of its base 24, which also defines the top surface of the back iron 16. The outer side surface of the teeth 14 taper inward and upward between plane 24 and the upper pole surface 20. The upper pole piece surface 20 and/or the bottom surface 26 of the back iron 16 is milled so that the upper pole face surface 20 and the bottom 26 of the core/back iron are parallel.

FIG. 2A shows a back iron with the cross-sectional width of the pole piece surface 20 of approximately ½ the maximum width of the back iron at its widest cross-sectional dimension. This core may be formed from back iron formed and stacked according to FIG. 2B and then cut at 28 and 30 and secured together to form the back-to-back "J" configuration as shown by FIG. 2A.

FIGS. 3A, 3B, 4, 5A and 5B disclose additional configuration of formed and spaced laminae providing cores 11 with cross-sectional pole piece face surfaces 20 of approximately ½ the width of the back iron at their respective widest parallel cross-sectional dimension and provides for gramme rings of minimum mean turn length.

It should be noted that the lamination of all the embodiments are either performed with laminae provided with precut teeth or the teeth are later formed after stacking to provide for placement of the gramme ring windings as shown in FIG. 1.

FIG. 6 is a showing of a working embodiment of the motor core 11 of the instant invention. The figure shows a vehicle 32 positioned above its support surface 34 and rail support members 36 with motors 38 employing gramme ring windings 18 positioned below support rails 40.

The motors are held in position and support the vehicle by their attachment to the vehicle motor support members 39 which are secured to the motors by convenient attachment means, such as bolts 41 shown. The rails are similarly held to their support members 36 by any convenient attachment means, such as bolts 42 as shown.

It should be obvious that the core of the instant invention would be employed equally as well when employed as a core for a conventional lap wound linear induction motor having windings 44 as shown in phantom in FIG. 1. When the core is utilized in a lap wound type motor substantially a unity height to width ratio can be obtained, thus providing a more favorable overall motor configuration.

This invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved laminated core for a linear induction motor employing windings comprising:
   a plurality of interleaved laminations of different heights;
   a top pole piece portion having an upper face and a bottom back iron portion with a rectilinear tapered transition therebetween, said face has a cross-sectional dimension less than the largest cross-sectional dimension of said back iron portion for concentrating the flux produced by the core.

2. The invention of claim 1 wherein said windings are gramme rings.

3. The invention of claim 1 wherein said windings are lap wound.

4. The invention of claim 1 wherein the individual laminations of said laminated core are side-by-side stacked.

5. The invention of claim 4 wherein said laminations have equal length and thickness.

6. The invention of claim 5 wherein the upper and lower surfaces of said laminations terminate on parallel planes.

7. The invention of claim 6 wherein the cross-sectional configuration of said pole piece portion is trapezoidal and said back iron portion is square.

8. An improved laminated core for a linear induction motor employing windings comprising:
   a top pole piece portion having an upper face and a bottom back iron portion, said face has a cross-sectional dimension of said back iron portion for concentrating the flux produced by the core, said back iron portion is serpentiform having side by side stacked laminations of equal length and thickness with their upper and lower surfaces terminating on parallel planes.

9. The invention of claim 8 wherein the lower surface of said laminations are first folded in a clockwise and then a couterclockwise direction.

10. The invention of claim 9 wherein the lower surface of said laminations terminate at a position elevated from the core base.

11. The invention of claim 9 wherein the lower surfaces of said laminations terminate on the same plane as the base of said back iron.

12. An improved laminated core for a linear induction motor employing windings comprising:
   a top pole piece portion having an upper face and a bottom back iron portion, said face has a cross-sectional dimension less than the largest cross-sectional dimension of said back iron portion for concentrating the flux produced by the core, said back iron portion is constructed of side by side stacked laminations of equal length and thickness, the lower portion of said laminations are spiralform.

13. The invention of claim 12 wherein said spiralform portion is formed in a clockwise direction.

14. An improved laminated core for a linear induction motor employing windings comprising:
   a top pole piece portion having an upper face and a bottom back iron portion, said face has a cross-sectional dimension less than the largest cross-sectional dimension of said back iron portion for concentrating the flux produced by the core, said back iron portion is constructed of side by side stacked liminations of equal length and thickness, said back iron portion is curvilinear.

* * * * *